United States Patent [19]
Swanson

[11] 3,933,475
[45] Jan. 20, 1976

[54] EXTRACTION OF COPPER FROM COPPER SULFIDES

[76] Inventor: Rollan Swanson, Eureka, Nev. 89316

[22] Filed: Nov. 11, 1974

[21] Appl. No.: 522,448

Related U.S. Application Data

[63] Continuation-in-part of Ser. No. 467,099, May 6, 1974.

[52] U.S. Cl. .................. 75/21; 75/72; 75/74; 75/89; 75/109
[51] Int. Cl.² ................................ C22B 15/00
[58] Field of Search ............. 75/21, 23, 72, 74, 89, 75/109

[56] References Cited
UNITED STATES PATENTS

3,450,523   6/1969   Socolescu ..................... 75/21

*Primary Examiner*—R. L. Andrews
*Attorney, Agent, or Firm*—Albert F. Kronman

[57] ABSTRACT

Copper is recovered from its sulfidic ores by a process wherein the ore is mixed and fused with at least a stoichiometric amount of a sulfide of sodium or potassium which may be prepared in situ by reacting sulfur with potassium or sodium hydroxide. The mixture is heated under vacuum in the absence of water, oxygen and $CO_2$ to a temperature above the melting point of the selected potassium or sodium sulfide and maintained below the decomposition point of the sulfide for a time sufficient to cause the sodium or potassium sulfide to combine with the sulfur of the copper sulfide to form metallic copper and copper oxides and the higher (sulfur content), sulfides of sodium or potassium, the resulting melt is cooled and leached with cold water to remove the sodium or potassium polysulfides and leaving behind metallic copper and copper oxides. The polysulfides can be recovered and recycled. The preferred unsaturated sulfides are sodium trisulfide and potassium tetrasulfide. This process is applicable to various ore concentrates including bornite, chalcocite, chalcopyrite, covellite, enargite, stromerite, tennanite, and tetramedrite. Other metals present in the copper sulfide containing ores including atimony arsenic, zinc, lead, silver, molybdenum can be removed after isolating the copper and copper oxides.

11 Claims, 2 Drawing Figures

EXTRACTION OF COPPER FROM COPPER SULFIDES

REFERENCE TO CO-PENDING APPLICATION

This application is a continuation-in-part application of my copending application, Ser. No. 467,099, filed May 6, 1974.

BACKGROUND OF THE INVENTION

This invention relates to a novel process for recovering copper from copper sulfide concentrates.

The main objects of this invention are to improve the efficiency of processes for recovering copper from copper sulfide concentrates; to reduce the overall cost of this production; and to reduce or eliminate thermal, air, water and chemical pollutions.

A significant novel feature of this invention is the use of the copper sulfide concentrate's sulfur atom, to prepare higher sulfur content polysulfides of sodium or potassium by fusing concentrate and lower sulfur polysulfides under vacuum conditions. Powdered elemental copper is recovered during this process. Thermal decomposition of the higher (sulfur content) polysulfides produces lower sulfur content polysulfides which in turn are used to produce additional higher (sulfur content) polysulfides and additional copper.

Because the literature in this field reported that fused sodium or potassium hydroxide when mixed with copper metal, produce first the oxide and, subsequently, carbonate complexes under atmospheric conditions, this invention is all the more unpredictable and surprising.

SUMMARY OF THE INVENTION

The process of the invention comprises fusing a dry sulfidic copper ore under vacuum in the absence of water, $CO_2$, and oxygen with a flux consisting essentially of an unsaturated sulfide of sodium or potassium at a temperature above the melting point of the sulfide but below its decomposition point and usually between 210°C and 360°C to deposit copper as elemental copper powder and to form copper oxides and a more saturated sulfide of sodium or potassium. By "unsaturated" sulfides are meant sodium and potassium mono, di and trisulfides and potassium tetrasulfide. The "saturated" polysulfides are $K_2S_5$ and $NA_2S_4$.

The polysulfides are formed by dissolving sulfur in lower (sulfur content) polysulfides. There is a solubility of $CuS$-$Cu_2S$ in the polysulfide melt. When the sulfur from the sulfide concentrates joins the polysulfide chain or ring, it behaves as elemental sulfur in making the higher sulfur content polysulfides. The copper recovers its electrons and is precipitated as copper. The solubility of copper in the melt is extremely low and the reaction proceeds because of this copper removal. The sulfur complex (from mono-sulfide) to penta-sulfide is divalent.

The complex, tho ionic as a whole, is held by coordinate bonds.

The flux may be prepared in situ by mixing at least stoichiometric amounts of sodium or potassium hydroxide and sulfur with the copper sulfide.

The flux can consist of sodium and potassium monosulfides, disulfides, trisulfides and potassium tetrasulfide and mixtures thereof which all tend to pick up sulfur to form the stable potassium pentasulfide or sodium tetrasulfides. The saturated sulfides can be thermally decomposed to form unsaturated sulfides and sulfur which are reused in the process.

DISCLOSURE

Typical reactions occuring in the present process are:

1. $Na_2S + 2CuFeS \xrightarrow{1200°C} S + Na_2S_2 + FeS + 2Cu$
2. $K_2S_4 + CuFeS_2 \xrightarrow{200°C} K_2S_5 + Cu + FeS$
3. $2KOH + 2 CuFeS_2 \xrightarrow{360°F} K_2S_4 + 2FeS + CuO + Cu + H_2O$ The copper sulfide ore concentrates is substantially dried prior to mixing and any water forming during the process is continually removed as it forms. Generally, water, carbon dioxide and oxygen interfere with this process. Hot water, even as vapor, decomposes some of the low sulfur content polysulfides of potassuim and to lesser extent of sodium. Water also introduced oxygen into the system. Carbon dioxide rapidly forms with the fused sodium or potassium hydroxide to produce carbonates which are not fusible, and displace sulfur from the polysulfides. Oxygen forms several oxy- complexes, which are not fusible, and displaces sulfur from the polysulfides.

The sulfide of potassium can be purchased in quantity. The conventional making of this compound is the reduction of potassium sulfate with carbon in a sealed container at moderate temperatures.

The melting point of the potassium hydroxide is 360°C and sodium hydroxide is 318°C. If the copper sulfide concentrate (moisture removed) is added in stages, the melting points for the potassium salts can be reduced to below 300°C. 300°C is the decomposition point of the penta-sulfide of potassium. Sodium tetrasulfide decomposes at approximately 385°C and the lowering of the temperatures in the stages should be below this point. It is essential that this reaction be carried out in a vacuum, as an inert atmosphere such as nitrogen or argon is not entirely satisfactory, for it does not make provision for removal of the water formed in the reaction. The concentrate is added in portions, preferably in four equal portions, with the last portion being added while the melt is cooled below the decomposition point of the sodium tetrasulfide or potassium pentasulfide.

The higher (sulfur content) polysulfides (saturated sulfides) of potassium have low melting points (206°C for the penta-sulfide, and 145°C for the tetrasulfide). The melt made using either the hydroxide and sulfur, or the polysulfides with less sulfur content than the pentasulfide, and which have produced either the tetrasulfide can be filtered thru perforated iron vessels under vacuum pressure or through a variety of other filters (provided that the hydroxide is no longer present) at comparatively low temperatures. The molten pentasulfide or tetrasulfide of potassium is passed through these filters, as the hot filtrate, the residue consists of copper, (copper oxide is also present if the hydroxide is used), iron sulfide, iron oxide and the impurity residual matter in the concentrate. The residue is water washed and freed from any residual polysulfides (if the water is cold and the residue is cold). The washed solid residue can be separated by gravity separation, the residues of no metallic value are easily washed off the table, as the iron sulfides have sp. gr. of between 4.3 – 5.0, whereas the metallic copper has a sp. gr. of 8.92, the cuprous oxide 6.0, and the cupric oxide 6.3 – 6.49. Any residual iron present in the oxide stage can be separated during the melting of the powdered copper into a solid mass. The major disadvantage of this hot filtration method is with the molybdenum di-sulfide recovery. The molybdenate ore is soluble in the polysulfides of potassium or sodium. As this hot filtration method uses no water, the molybedenum compounds are partially soluble in the molten polysulfides of potassium, however, some remains as solid residue.

When the sulfur content of the polysulfides made in the melt reaches the potassium pentasulfide state, as observed by the orange color of the melt, the melt can be treated with hot or cold water as the pentasulfide is extremely water soluble and readily extracted when the melt is also cold. The tetra-sulfide decomposes in hot water. When these two sulfides of potassium are in water solution they can be filtered and separated from the solid residues remaining in the melt. Any molybdenum di-sulfide present is soluble along with the tetra and pentasulfides of potassium and can be recovered by displacement by a more active metal such as zinc. The filtrate from this recovery can be evaporated to dryness by application of heat. The pentasulfide of potassium when dried can be decomposed into lower (sulfur content) polysulfides by elevating the temperature to over 300°C. This is best done in a vacuum wherein there is little displacement of the sulfur by oxygen, and little carbonate formation. The sulfur formed under the vacuum conditions is more easily separable from the lower sulfur content polysulfides so formed either by filtration of the tetrasulfide at 160°C or allowing to cool and physically removing same by picking it out as a single mass.

The sodium series does not have the well-defined differently colored polysulfides of the potassium series. The monosulfide and the tetrasulfide seem to be the most definite compounds of this series. The tetrasulfide of sodium sometimes evaporates as a yellow crystal, at other times it remains as a dark red liquid. Under vacuum conditions, sulfur can be recovered from sodium tetrasulfide or the hypothetical sodium pentasulfide at 385°C and polysulfides of indeterminate composition constituted. These polysulfides can be used to treat additional copper sulfide concentrate. Molybdenum also is soluble in these higher sulfur content sodium polysulfides and is recoverable by more active metal displacement from a water solution of them. Higher temperatures are required to keep the lower (sulfur content) polysulfides in liquid form after the thermal removal of sulfur from the higher content polysulfides than for the potassium series. The hot filtration used requires either asbestos or perforated iron filters.

The use of the mono-sulfides of potassium or sodium requires such high temperatures that the fusing of the copper produced into solid pieces, followed by the slow cooling of the residual melt gave intermediate sulfur content polysulfides which were best dissolved by absolute ethyl alcohol. Any molybdenum present in these melts was left behind in the solid residue. This was soluble when the solid residues were water washed following the alcohol extraction. The alcohol solution was distilled to produce the polysulfides in solid form.

The objects and the advantages of the invention will become apparent upon reference to the following description thereof and to the appended drawing wherein.

DESCRIPTION OF APPARATUS

Figure 1:
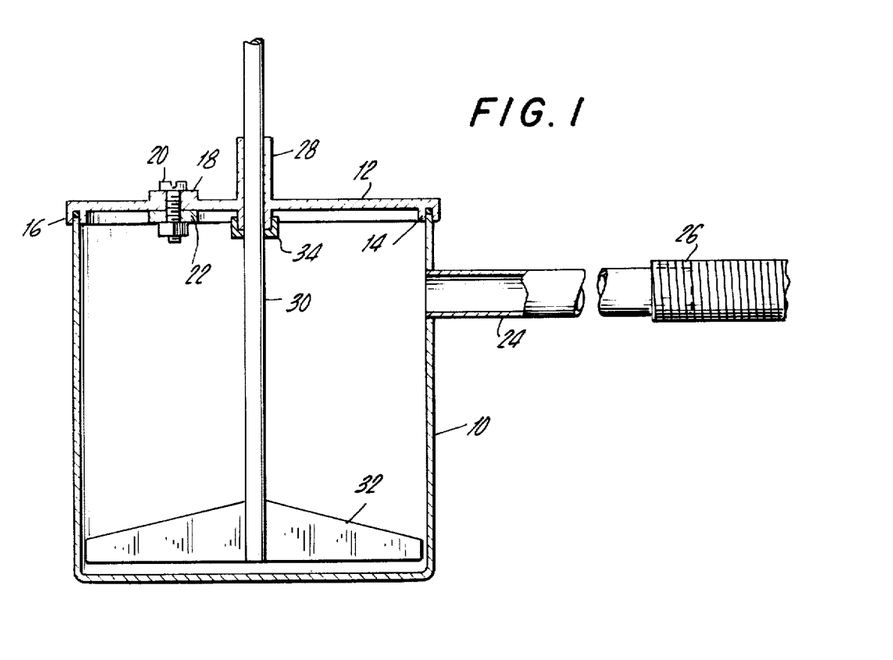
FIG. 1 is a diagrammatic illustration of one form of apparatus suitable for carrying out the process according to the invention and FIG. 2 is a larger scale modification thereof.

FIG. 1 illustrates apparatus suitable for small scale batch practice of the process. The apparatus includes a generally circular vessel 10 made of white iron or nickel. The vessel is closed by a lid 12 with two sets of rings 14 and 16 welded thereto so that the rings seal the lip of the top of the vessel. Four sets of flanges (two shown) 18 and 22 were used with bolts 20 to secure the lid to the top of the vessel with an inorganic sealing material. A pipe 24 is provided in the side of vessel 10 in communication with the interior thereof. A flexible tube 26 connects the vessel to a calibrated, cooled, trap and protects the vacuum pump (not shown) from water vapor and measures the amount of water evacuated. A pump found suitable for this apparatus is one rated at 1 cu.ft./min. at 26 inches Hg pressure.

The vessel is provided with an agitator having blades 32 at the lower end of shaft 30. The upper end of the shaft emerges from the vessel through lubricated shaft sleeve 28 welded in lid 12. A sealant cup 34 is mounted at the lower end of sleeve 28. The agitator is connected to a motor capable of rotating it at about 120 RPM. The vessel is heated by a hot plate (not shown) capable of raising its internal temperature from 100°to 532°C.

Figure 2:
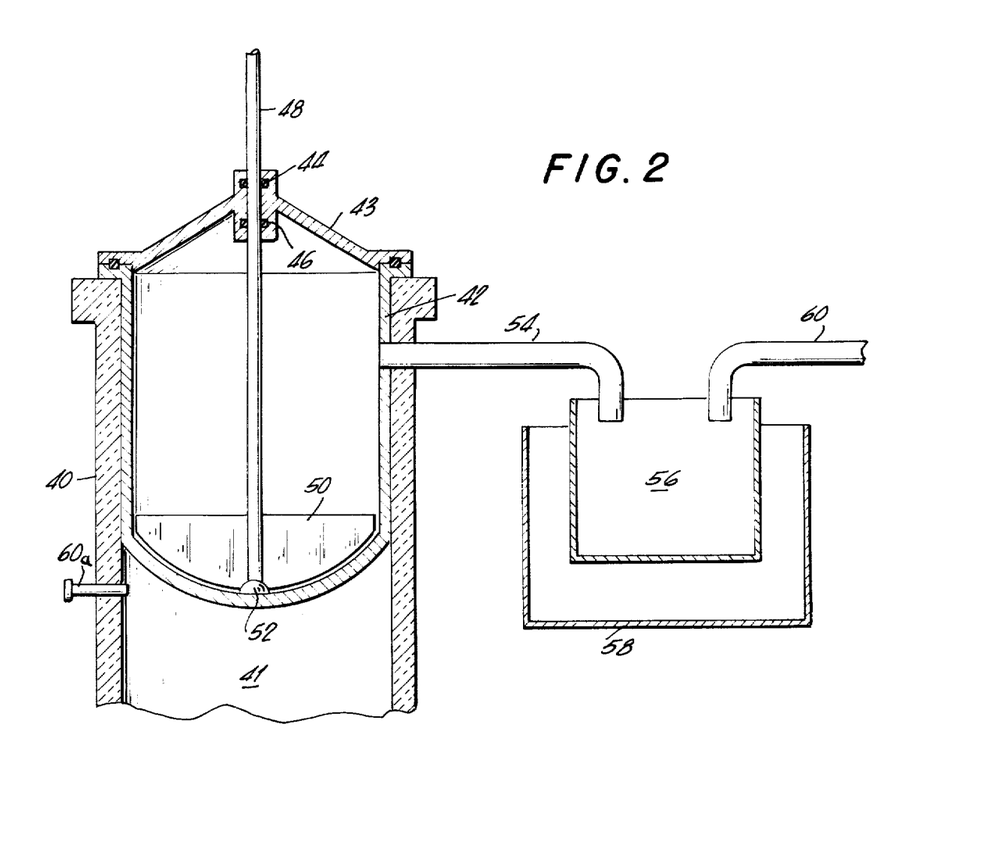

A larger apparatus consisting essentially of a gas fired furnace is shown in FIG. 2. As shown, the apparatus has a furnace 40 with burner area 41 below an inner iron vessel 42 sealed to an upper lid 43. A pair of seals 44, 46 are mounted in the upper part of lid 43 in contact with the upper part of shaft 48. The lower part of shaft 48 has agitator or impeller blades 50 secured thereto and its tip rotates on hemispherical bearing 52 secured to the bottom of vessel 42. A vacuum line 54 welded to the vessel 42 and the furnace 40 is in communication with the trap 56 and vessel 42 mounted in cooling tank 58. A second line 60 connects the apparatus to a vacuum pump rated at 18 cu. ft. per minute. A thermostat 60a controls the temperature from 100 to 1000°F.

The following examples illustrate ways in which the principle of the invention has been applied but are not to be construed as limiting its scope.

EXAMPLE 1

The data of this example illustrates the recovery of copper by the use of potassium polysulfide prepared in situ.

The copper concentrate used was a Kennecott Corporation chalcopyrite concentrate containing 29.1% copper, 26.1% iron, 29.2% sulfur and a small amount of molybdenum sulfide. The total chalcopyrite content of the concentrate was 84.4% $CuFeS_2$. the atomic weight of chalcopyrite ($CuFeS_2$) is 183.3 and the adjusted weight at 84.4% pure, is 217.2. The ore was dried at around 300°C for one half hour and added with KOH and sulfur to the apparatus shown in FIG. 1 to give the reaction shown below:

$$2KOH + 2CuFeS_2 + 2S + 360°C \longrightarrow K_2S_4 + 2FeS + CuO + Cu + H_2O$$
$$112 \quad\quad 366.6 \quad\quad 64 \quad\quad\quad\quad\quad\quad\quad 206 \quad\quad 175.8 \quad 79.5 \quad 63.5 \quad 18$$

This reaction was carried out under vacuum conditions. The potassium hydroxide flakes and the sulfur and the chalcopyrite concentrate were agitated together during the heating process. As the potassium hydroxide flakes begin to melt, it appears that it first forms on the surface the pentasulfide as the flakes turn orange, then it changes to deep red, the tetrasulfide. The pentasulfide of potassium is formed first and diluted down to the lower (sulfur content) polysulfides. The temperature is set for 360°C and the surface of the flakes attain the melting point before the bulk of the potassium hydroxide. As the temperature approaches 300°C the entire mass boils up to approximately three times its original volume and much steam is ejected. Agitation of the melt continues and a melt can be sustained if the temperature is below 300°C. Above 300°C the pentasulfide of potassium is decomposed and as this sulfur is picked up by the polysulfides already formed but not in final balance, sulfides and polysulfides can be formed which require much higher temperatures to remain as melts. The melt is primarily potassium tetrasulfide $K_2S_4$ and is liquid at 150°C. The tetrasulfides is stable to over 800°C. The originally formed pentasulfide is liquid at 206°C and only stable to 300°C. Chemical analysis of the melt showed an empirical $K_2S_4$ formula, though some mixture of polysulfides was probably present. If after achieving the melt, at temperatures below 300°C and maintaining the melt during a five minute period, supplying good agitation, the melt is elevated to over 300°C the melt shows predominatly characteristics of $K_2S_4$. Apparently, the mix of the polysulfides is narrowed to primarily the tetrasulfide. The melt is cooled to just below 200°C and, maintaining the vacuum conditions, filtered through a −3 micron iron crucible. The bottom of this crucible is fitted with −3 micron holes and fits into the vacuum line opening inside the vacuum tank. A trap is inserted in the line just beyond the perforated crucible holder. Originally some part of the solids filter through into the trap, but the openings gradually narrow and the true liquid is the predominant part at the end of the filtering. An alterante to this filtration method, consists in keeping the melt below 300°C wherein the FeS of the equation was principally changed to FeO and the additional sulfur made for pentasulfide of potassium. This is very stable and extremely soluble in water. The copper in this equation was entirely reduced to the metallic form.

polysulfide solution. These are recoverable by metallic replacement EMF, and are formed during the cooling stages of the melt. The sesquisulfide seemed to predominate.

When the temperature of the reaction exceeded 300°C and the tetrasulfide form of potassium predominated, the water extraction had to wait until the melt was at room temperature. Even warm solidified melt with water added tended to decompose.

After the water extraction of the potassium pentasulfide the water was filtered, the molybdenum extracted, and the residue evaporated to dryness; heat in excess of 300°C drives off one sulfur, and forms the tetrasulfide plus sulfur. Above 850°C additional sulfur could be driven off. The tetrasulfide of potassium was capable of extracting a sulfur from the chalcopyrite concentrate and leaving free copper.

EXAMPLE II

The data of this example illustrates the effect of different temperatures.

130 lbs. of potassium hydroxide at 86% purity was mixed with 434.4 lbs. of chalcopyrite concentrate (containing 29.1% copper, 26.1% iron and 29.2% sulfur) (a small quantity of molybdenum was present as the sulfide) 64 lbs. of sulfur was added. The temperatures for one set of tests were set at 360° to 320°C for the other set of tests the temperatures were set at 280°C to 290°C. Approximately one-half hour was necessary for the temperatures to reach melting points. During the pre-melt heating approximately 4% to 5% of the total weight of concentrate came over as water, when the melt temperature was reached (determined in separate experiments as 280°C) water was liberated from the reaction in an instant reaction. Nearly 9% of the weight of the concentrate came suddenly over condensed in the cooling trap in the vacuum line. This was in addition to the water driven off in the pre-melt heating.

Agitation was continued for five minutes after this sudden reaction. Tests outside the cooker showed an expansion of the volume during this sudden reaction at the melting point of approximately three times the original volume. At a temperature above 300°C, the reaction taking place is believed:

$$2KOH + 2CuFeS_2 + 2S \longrightarrow K_2S_4 + 2FeS + CuO + Cu + H_2O$$
$$112 \quad\quad 366.6 \quad\quad 64 \quad\quad 206 \quad\quad 175.8 \quad\quad 79.5 \quad 63.5 \quad 18$$

The above reaction was adjusted as to the 86% purity of the KOH and the 84.4% purity of the chalcopyrite $$2KOH + 2CuFeS_2 + 2S + 295°C = K_2S_4 + FeS + FeO + 2Cu + H_2O$$
$$112 \quad\quad 366.6 \quad\quad 64 \quad\quad\quad\quad\quad 238 \quad\quad 87.8 \quad\quad 71.8 \quad\quad 127 \quad\quad 18$$
$$\quad\quad\quad (542.6) \quad\quad\quad\quad\quad\quad\quad\quad\quad\quad\quad\quad\quad\quad\quad (542.6)$$

A little metallic Fe can be removed magnetically from the residue after dissolving out the $K_2S_5$. The melt, when the pentasulfide is formed, can be added to water as the potassium pentasulfide is extremely soluble and the residues of iron sulfide and oxide and the metallic copper remain along with the lime and silica residue impurities from the chalcopyrite concentrate. The molybdenum sulfide had picked up additional sulfur to form molybdenum sulfides which are soluble in the concentrate. When the melt was throughly cooled, water could be added and the potassium tetrasulfide dissolved with a considerable excess of water (a 12% solution could be made). This left a solid residue of iron sulfide, copper oxide, metallic copper and the impurities in the 84.4% chalcopyrite concentrate.

The molybdenum either formed a molybdenate or became soluble as a polysulfide in the potassium polysulfides. It could be recovered by electrolysis from the water solution added after complete cooling of the melt.

When the temperature was held below 300°C the following reaction occured:

$$2KOH + 2CuFeS_2 + 2S = K_2S_3 + FeS + FeO + 2Cu + H_2O$$
$$112 \quad\quad 366.6 \quad\quad 64 \quad\quad 238 \quad\quad 87.8 \quad\quad 71.8 \quad\quad 127 \quad\quad 18$$

The corrections for the impurities in the 86% potassium hdroxide and the 84.4% chalcopyrite concentrate were also made in the above tests. The temperature was 290°C and the vacuum conditions were maintained. The potassium pentasulfide seemed to be a much more stable compound and had an orange color, its melting point corresponded to the published figure of 206°C and it was very soluble in either hot or cold water (at least a 50% solution could be made). Again the molybednum was recovered by zinc displacement from the water solution. Some metallic iron was removed magnetically from the washed residue. Careful heating to above 1085°C could melt the copper and avoid the decomposition of the iron sulfide.

After extracting the polysulfides with water the water was filtered and evaporated to dryness, and the solid polysulfides were isolated. The pentasulfide was decomposed to lower sulfur content polysulfides at around 300°C (under vacuum conditions) the tetrasulfide required almost 900°C to remove more sulfur. The sulfur was collected as elemental sulfur. With the sulfur content lowered in the potassium polysulfide, the lower sulfur content polysulfide-disulfide, trisulfide or tetrasulfide in a fused state was used to reduce additional copper sulfide to the metallic state.

It was found advisable to start with the trisulfide of potassium rather than the disulfide because of the much higher fusing point of the disulfide (470°C) vs. (275°C) for the trisulfide. The temperature could not be dropped rapidly enough with the disulfide to prevent the decomposition of the pentasulfide (206°C). In making the polysulfides from the potassium hydroxide it was observed that the pentasulfide forms first and is diluted down as more of the substances fuse, the pentasulfide seems to be the most readily formed and also the most stable.

All of the above series of tests were run with 130 lbs. of potassium hydroxide, and 434.4 lbs. of the 84.4% chalcopyrite concentrate, with 64 lbs. of sulfur added.

EXAMPLE III

The data of this example illustrates the use of a mixture of potassium disulfide and trisulfide to acquire sulfur from copper sulfide concentrates with the formation of tetrasulfide and pentasulfides of potassium with the liberation of metallic powdered copper.

The apparatus shown in FIG. 2 was employed in this example. The copper concentrate (29.1% copper, 26.1% iron and 29.2% sulfur) was employed and the moisture content reduced or eliminated by a pre-heating for one-half hour at 300°C. the mixed disulfide-trisulfide of potassium were heated to 470°C under the vacuum conditions (18 cu. ft. of air evacuated each minute). The concentrate was added to this disulfide-trisulfide melt. 158 lbs. of the polysulfides, 434.4 lbs. of the concentrate (weighed before dehydrating). The a median of the molecular weights of the polysulfides were used in lbs., the concentrate had a $CuFeS_2$ content of 84.4% and at two times the molecular weight of 183.3 X 2X correction factor for 84.4% content gave 434.4 lbs. of concentrate. The solubility of sulfur in the disulfide of potassium and its occurence wherein one would expect the monosulfide leads to the conclusion that the disulfide is a stable form of the polysulfides. The ready absorption of sulfur shows that potassium pentasulfide is the saturated form (as regards the sulfur content) and that sulfur will be picked up until this pentasulfide form is reached. After one-half hour of agitation of the melt, it was cooled and water (cold) was added to dissolve out the tetrasulfide and pentasulfides of potassium formed. The melt was cooled and leached with cold water, as hot water can decompose the tetrasulfide of potassium. The molybdenum salts formed were water soluble and replaceable by metallic iron. The water solutions of the pentasulfides and tetrasulfides of potassium required a final combined concentration to make a 5% solution. The removal of the molybdenum accomplished, the solution was filtered and the filtrate evaporated to dryness and proved to be essentially the tetrasulfide of potassium with some pentasulfide present. Washing the solid residues gave a 92% recovery of the copper, the iron was present as the sulfide and a 95% recovery was made, the sulfur was now combined with the potassium as a polysulfide.

EXAMPLE IV

The data of this example shows the use of the pre-made sulfur unsaturated polysulfides of potassium and with copper sulfide concentrates and the recovery of potassium pentasulfide. 217.2 lbs. of copper sulfide concentrate containing 29.1% copper, 26.2% iron and 29.2% sulfur with a small quantity of molybdenum sulfide were heated at 300°C for one-half hour to reduce the mositure content. A smaller separate sample of the same concentrate gave a 4.7% weight loss under the same one-half hour heating at 300°C. This 434.4 lb. sample was assayed at 84.4% $CuFeS_2$ (molecular weight 183.3) adjusted for the 84.4% purity and made up in lbs. X 2. The FeS was assumed to be inert. The potassium tetrasulfide was made from previous runs of the potassium hydroxide and sulfur treated with copper sulfide concentrates to produce potassium polysulfides, and from lower sulfur content polusulfides of potassium which had been treated to bring the sulfur content up to the tetrasulfide of potassium. The color (deep red-brown) and the low melting point (145°C) confirmed that this substance was essentially potassium tetrasulfide. The tetrasulfide of potassium had been isolated from the metallic residue, the oxides and sulfides, and impurities of the previous treatments. It had then been dissolved in cold water, filtered, and the filtrate evaporated to dryness. 206 lbs. of this potassium tetrasulfide was melted at 145°C and then the temperature raised to 220°C. The vacuum conditions prevailed both on the preheated concentrate prior to mixing with the potassium tetrasulfide, on the potassium tetrasulfide during the entire melt, and on the mix after the addition of the concentrate. This example was performed in the vessel of FIG. 2. Agitation commenced at the addition of the concentrate. The vacuum pump evacuated 18 cu. ft. / min., the temperature was maintained between 220°C and 240°C. After one-half hour, the vacuum was maintained but the melt was allowed to cool. The orange color of the potassium pentasulfide was noted, a small sample of the melt also remelted at 206°C confirming the presence of the potassium pentasulfide. After two hours, hot boiled, deoxygenated water was allowed to flow into the cooled iron liner of the furnace using the back pressure of the vacuum pump to pull it into the liner. The bulk of the melt disssolved, as potassium pentasulfide (25% solution) the molybdenum also was dissolved out from the solid residues as either molybdenum polysulfide dissolved in the potassium pentasulfide or as potassium molybdenate.

The molybdenum was recovered by replacement with metallic zinc which precipatated the molybdenum and entered solution. Three 1,000 lb. of water washes were employed separately on the melt. The washes after the molybdenum removal were filtered and evaporated to dryness in large flat pans with the heat kept to not over 180°C. The first wash recovered almost 200 lbs. of potassium pentasulfide, the second another 21 lbs., and the third 5 lbs. The washed solid residues were gravity tabled and the silica and limes of the concentrate impurities were reduced. The residue was analyzed and shown to be copper (121 lbs.), iron (7 lbs.), iron sulfide (147 lbs.), iron oxide (5 lbs.). From a content of pure $CuFeS_2$ 266.6 lbs, 344 lbs. were accounted for in the copper, iron, iron sulfide, iron oxide, and the sulfur as polysulfide recoveries. Loss was on the gravity table with too fine material from the solid residues being tabled.

EXAMPLE V

The copper content of the concentrate used was made up as follows:

12.46% of the concentrate was composed of copper from chalcopyrite ($CuFeS_2$)
  The chalcopyrite comprised 36.036% of the total concentrate
2.5% of the concentrate was composed of copper from Bornite ($Cu_5FeS_4$)
  The Borite comprised 3.894% of the total concentrate weight
7.176% of the concentrate was composed of copper from Chalcscite ($Cu_2S$)
  The chalcocite comprised 8.984% of the total concentrate weight
7.176% of the concentrate was composed of copper from Covellite (CuS)
  The covellite comprised 10.790% of the total concentrate weight
0.934% of the concentrate was composed of copper from Cuprite ($Cu_2O$)
  The cuprite comprised 1.0517% of the total concentrate weight
0.934% of the concentrate was composed of copper from Tennorite (CuO)
  The tennorite comprised 1.169% of the total concentrate weight
31.2% of the concentrate was composed of copper. The minerals chalcopyrite, chalcocite, bornite, covellite, cuprite and tennorite composed 61.925% of the total concentrate weight.

The copper content and percentage of copper present in the Covellite and the Chalcocite were not known. Therefore, the 46% of the 31.2% total copper content of the concentrate were assumed to be equally divided (23% of the copper content or 7.176% of the total concentrate) between the Covellite and the Chalcocite. The ratio of the copper present as Tennorite or Cuprite was not known. It was assumed that the copper content of these oxides was equal or of the known 1.868% of copper in these forms, that it was equally divided between the Cuprite and Tennorite at 0.934% each of the concentrate weight.

The concentrate also contained the following metals and minerals;

1.3% of the concentrate was composed of molybdenum assumed to be molybdenite ($MoS_2$). This would make the molybdenite comprise 2.167% of the total concentrate weight.

5.8% of the concentrate was composed of lead from galena (PbS). The galena comprised 6.6932% of the total concentrate weight.

0.949% of the concentrate was composed of silver from argentite ($Ag_2S$). Some parts of this silver was from Proustite ($Ag_3AsS_3$), Pyrargyrite ($Ag_3SbS_3$), Polybasite ($Ag_{16}Sb_2S_{11}$), Stephanite ($Ag_5SbS_4$). It was calculated as Argentite and as such would compose 1.15% of the total concentrate weight.

6.7% of the concentrate was composed of iron fron iron pyrites ($FeS_2$). This pyrites comprised 14.74% of the total concentrate weight.

The total mineral content of the concentrate was 86.675% leaving 13.325% for moisture content, the various forms of lime, and the silicas etc.

The above list of minerals were made up in both grams and pounds by a formula of their molecular weight times the percentage present in the concentrate. In this manner the optimum efficiency in determining the amounts and sulfur content of the polysulfides used to produce the metals can be calculated.

Chalcopyrite content is 36.036%. Molecular weight of $CuFeS_2$ equals 183.3. In 1000 grams of concentrate there is 360.36 grams of $CuFeS_2$. This represents 1.966 times the molecular weight of chalcopyrite. The molecular weight of potassium tetrasulfide is 206. Multiplying by the 1.966 factor gives a weight of 404.996. This represents the quantity of potassium tetrasulfide necessary to react with the chalcopyrite portion of the copper sulfide concentrate. The products of this reaction are copper, iron sulfide, and potassium pentasulfide. The molecular weight of the copper is 63.5, this is multiplied by the 1.966 factor and gives a weight in grams of 172.61, and the potassium pentasulfide formed in the reaction has a molecular weight of 238 and this weight multiplied by the 1.966 factor gives a weight in grams of 467.908.

| $CuFeS_2$ | + | $K_2S_4$ | = | Cu | + | FeS | + | $K_2S_5$ |
|---|---|---|---|---|---|---|---|---|
| 360.36 gm. | | 404.996 gm. | | 124.84 gm. | | 172.61 gm. | | 467.908 gm. |
| | | (765.356) | | | | (765.356) | | |

Bornite content is 3.894%. Molecular weight of $Cu_5FeS_4$ equals 501.3. In 1000 grams of concentrate there is 38.94 grams of $Cu_5FeS_4$. This represents 0.07768 times the molecular weight of Bornite. The potassium tetrasulfide combines with the Bornite according to the following formula:

$Cu_5FeS_4 + 3 K_2S_4 = 5 Cu + FeS + 3 K_2S_5$

It will be observed that the Bornite requires three times the molecular weight of potassium tetrasulfide for this reaction. 3.984% Bornite content of the concentrate is divided by the molecular weight (501.3) =0.07768. This factor (0.07768) is multiplied by the potassium tetrasulfide molecular weight (206 × 3 according to the illustrating formula) 618 = 48.00 grams of potassium tetrasulfide necessary for the reaction with the Bornite. This reaction produces copper, molecular weight of 63.5 × 5 = 317.5 and this 317.5 is multiplied by the 0.07768 factor to give 24.6634 grams of copper, the iron sulfide produced has a molecular weight of 87.8 and this weight is multiplied by the 0.07768 grams of iron sulfide. The potassium pentasulfide produced is three times the molecular weight (238 × 3 = 714) and this weight is multiplied by the 0.07768 factor to give 55.4635 grams of potassium pentasulfide.

The chalcocite content of the concentrate is 8.984%. The molecular weight of the chalcocite is 159. In 1000 grams of concentrate there are 89.84 grams of chalcocite. The factor here is the amount of chalcocite present in 1000 grams is 56.5% of the molecular weight of chalcocite. The molecular weight of potassium tetrasulfide is 206 and 56.5% of this weight is 116.39 grams of potassium tetrasulfide necessary to react with the amount of chalcocite in 1000 grams of concentrate. This reaction produces copper (there are two coppers to each sulfur in chalcocite) and the molecular weight of copper is 63.5. The 63.5 × 2 = 127. The 127 molecular weight of two coppers times the 56.5% factor gives 71.755 grams of copper produced from the 1000 gram concentrate sample. The tetrasulfide of potassium picks up the sulfur from the chalcocite and becomes potassium pentasulfide. The molecular weight of potassium pentasulfide is 238 and the 56.5% factor = 134.47.

The Covellite (CuS) content of the concentrate is 10.79%. The molecular weight of Covellite is 95.5. In 1000 grams of concentrate there is 107.90 grams of Covellite. The factor here is the amount of Covellite present in 1000 grams of concentrate which represents 1.13 times the molecular weight of Covellite. The molecular weight of potassium tetrasulfide is 206 and 1.13 times this weight (206) gives in grams the amount of potassium tetrasulfide necessary to react with the amount of Covellite in 1000 grams of concentrate. This figure is 232.78 grams. This reaction produces copper, molecular weight 63.5, and the 1.13 factor times this weight gives 71.755 grams of copper produced. The tetrasulfide of potassium has picked up the sulfur from the Covellite and become the pentasulfide of potassium. The potassium pentasulfide has a weight of 238 and 1.13 times this figure gives 268.94 grams of potassium pentasulfide produced.

| CuS | + | $K_2S_4$ | = | Cu | + | $K_2S_5$ |
|---|---|---|---|---|---|---|
| 107.90 gm. | | 232.78 gm. | | 71.75 gm. | | 268.94 gm. |
| | | (340.68) | | | | (340.68) |

The above are the sulfide forms of copper in this concentrate. 29.33% of this concentrate is the copper of these copper sulfide minerals. The minerals (chalcopyrite, chalcocite, bornite, and covellite) constitute 59.674% of the total weight of the concentrate.

An additional 1.848% of the total concentrate weight was present as copper in oxide minerals (tennorite, cuprite). The minerals (tennorite, cuprite) constitute 2.2207% of the total concentrate weight. For the purposes of the initial treatment with the potassium tetrasulfide these minerals (tennorite, cuprite) were considered as not reacting to produce elemental copper.

In addition to the above copper minerals the following sulfide constituents of the concentrate are considered.

The galena (PbS) content of the concentrate is 6.6932% whose molecular weight is 239. In 1000 grams of concentrate there is 66.932 grams of galena. The molecular weight (239) times 0.28 (the factor) equals 66.92. The molecular weight of potassium tetrasulfide is 206 and times the factor (0.28) equals 57.68 grams necessary to react with 66.92 grams of galena. The products of this reaction are lead (molecular weight 207) × the factor (0.28) = 57.96 grams of lead, and potassium pentasulfide (molecular weight 238) × the factor (0.28) = 66.64 grams of potassium pentasulfide.

| $Cu_5FeS_4$ | + | 3 $K_2S_4$ | = | 5 Cu | + | FeS | + | 3 $K_2S_5$ |
|---|---|---|---|---|---|---|---|---|
| 38.94 gm. | | 48.0648 gm. | | 24.6634 gm. | | 6.8203 gm. | | 55.4635 gm. |
| | | (86.945) gm. | | (86.945) gm. | | | | |

| PbS | + | $K_2S_4$ | = | Pb | + | $K_2S_5$ |
|---|---|---|---|---|---|---|
| 66.932 gm. | | 57.58 gm. | | 57.96 gm. | | 66.69 gm. |
| | | (124.61) | | | | (124.61) |

| $Cu_2S$ | + | $K_2S_4$ | = | 2 Cu | + | $K_2S_5$ |
|---|---|---|---|---|---|---|
| 89.84 gm. | | 116.39 gm. | | 71.75 gm. | | 134.47 gm. |
| | | (206.23) | | | | (206.23) |

The molybdenite ($MoS_2$) molybdenum disulfide, constitutes 2.167% of the total concentrate weight and its molecular weight is 159.94. In 1000 grams of concentrate there is 21.67 grams of molybdenite. The molecular weight (159.94) times the factor (0.1355) = 21.67, the quantity of molybdenite present in the concentrate. The molecular weight of potassium tetrasulfide is 206. The reaction with the molybdenite requires two molecular weights of potassium tetrasulfide (206 × 2 = 412) the double molecular weight times the factor (0.1355)

= 55.8 grams of potassium tetrasulfide which is the quantity necessary to react with the 21.67 grams of molybdenite present in 1000 grams of concentrate. The product of this reaction is molybdenum (molecular weight 95.94) and this weight times the factor (0.1355) = 12.99987) and potassium pentasulfide (molecular weight 238). However, the use of twice the molecular weight of the potassium tetrasulfide produces two times the molecular weight of the potassium pentasulfide or 476. This molecular weight (476) × the factor (0.1355) = 64.498 grams of potassium pentasulfide.

The molybdenum produced in this reaction is not in elemental form. The greatest percentage of the molybdenum becomes either a water soluble polysulfide or possibly a molybdenate also water soluble.

The argentite ($Ag_2S$) silver sulfide, (the mix of argentite, proustite, pyrargyrite, stephanite, polybasite are all calculated as argentite) constitutes 1.15% of the total concentrate weight. The molecular weight of argentite is 247.74. The molecular weight (247.74) times the factor (0.4642) gives the 11.5 grams actually present in the concentrate. In 1000 grams of the concentrate there are 11.5 grams of argentite. To react with this quantity of argentite the molecular weight of potassium tetrasulfide (206) times the factor (0.4642) gives the 9.56 grams necessary to react with the quantity of argentite in the concentrate. This reaction produces two times the molecular weight of silver (107.87 × 2 = 215.74). This molecular weight (215.74) times the factor (0.4642) = 10.01465 grams of silver. Also produced is potassium pentasulfide the molecular weight of $K_2S_5$ = 238 and this figure times the factor (0.4642) = 11.047 grams of potassium pentasulfide.

The silver deposited was partially resulfidized, and about 14% of the silver was recovered from the molten lead in which it is soluble. The antimony and arsenic recovered were presumably from the silver sulfides containing these metals (proustite, pyrargyrite, stephanite, and polybasite). The recovered antimony and arsenic were water soluble (along with the molybdenum) and were precipitated with zinc from the potassium pentasulfide water solution.

1000 grams of this concentrate were preheated at 300°C for a period of one-half hour. Separate quantity of concentrate indicated that this treatment reduced the weight 3.7%. It was calculated that this 1000 grams of concentrate contained 695.142 grams of sulfide minerals capable of reacting with the potassium tetrasulfide (polysulfides). 37 grams of water and some carbon dioxide were removed by the one-half hour roast at 300°C.

Under vacuum conditions (using a pump capable of evacuating 1 cu. ft. of air at 26 inches of mercury pressure) in the vessel of FIG. 1, 925.297 grams of potassium tetrasulfide was melted and brought to 260°C. When the potassium tetrasulfide had reached 300°C under vacuum conditions the concentrate was added, the temperature of the concentrate had not exceeded 300°C and the concentrate was somewhere between the 260°C of the potassium tetrasulfide and the starting temperature of the concentrate (300°C). The melt was stirred by means of the propeller type agitator in the vessel while the temperature was maintained at 260°C (minimum) for one-half hour. Through the sealed window in the vessel could be observed the change over from the deep red-brown of the potassium tetrasulfide to the orange color of the potassium pentasulfide (somewhat discolored by the solid residues produced and the impurities present in the concentrate). The melt was poured into a 1000 cc Pyrex glass tube, open at the top and tapering at the bottom. The tube was then sealed and the temperature kept at just over 206°C (melting point of potassium pentasulfide) and without agitation the solids settle according to their specific gravities. The solid particles (of isolated metals) were so finely divided that this gravity separation was only partially successful (the viscosity of the potassium pentasulfide melt was not known).

The melt was cooled to below 100°C and water was added. 3 litters (3000 cc) of water was added to the melt in 1000 cc additions with a pouring off of the liquid after each 1000 cc addition. The first addition was filtered, the solid residues added to the melt and the filtrate evaporated to dryness with heat supplied and kept below 300°C during the final removal of the water. The calculated amount of potassium pentasulfide to be made during the melt was 1,068.75 and the actual recovery was 483.66 grams. The starting amount of the tetrasulfide of potassium was 1,068.75 and the amount of pentasulfide formed exceeded the starting amounts of tetrasulfide.

It was difficult to weigh the pentasulfide of potassium formed because it is either deliquescent or hydroscopic and this water kept the weight increasing. The recovery approximated 65% in the initial 1000 cc wash, 30% in the second 1000 cc wash, and the remainder of the 1,383.66 grams in the third 1000 cc wash.

After the filtration of these three water washes, zinc was added to the warm (heated by the melt at 100°C when the first 1000 cc water wash added) solution, to precipitate the molybdenum, arsenic and antimony. The filtrate was heated to just below boiling to speed up the replacement of the molybdenum, arsenic and antimony. The molybdenum, arsenic and antimony were replaced and deposited as black masses, the zinc also reprecipitated as zinc sulfide in the sodium pentasulfide water solution. The solution was refiltered and then evaporated to dryness.

Thr dried potassium pentasulfide was then placed in the same iron vessel used to make the melt with the tetrasulfide of potassium and the concentrate, the same vacuum conditions were employed and the temperature used was 360°C. The potassium pentasulfide began its decomposition at 300°C and broke up into potassium tetrasulfide and sulfur, potassium disulfide and three sulfurs. The potassium disulfide solidified (melting point 470°C). The potassium tetrasulfide and the potassium disulfide seemed to react (the liquid potassium tetrasulfide seemed to dissolve some of the potassium disulfide and form potassium trisulfide). The disulfide of potassium solidified at the top of the melt along with the hi-viscosity sulfur melt. The potassium disulfide was removed along with some quantity of adhering sulfur by lifting it out. The sulfur was ladled off in molten stage (the container was opened and the vacuum turned off). The trisulfide of potassium was the next to solidify (252°C) and the tetrasulfide of potassium remained in a liquid melt condition until 145°C was reached.

The solids from the glass tube and the readded residues from the filtration were boiled with water and this liquid filtered and evaporated to dryness. This filtrate was added to the previous treatment of the mass filtrate prior to adding the zinc for precipitation of the molybdenum, arsenic, and antimony.

The solids after the washing and boiling were heated to 360°C and the lead became a large button containing about 14% of the silver calculated to be in the solids. The weight of the lead button with the silver was 56.09 grams. When the lead was oxidized by heating in a blast of air, 1.4 grams of silver remained, the recovered lead weighed, therefore, 55.49 grams of the theoretical 57.96 present in the concentrate.

The solids now contain the copper, (293.0034 grams), the unreacted copper oxides 22.206 grams, 8.614 grams of silver, 326.83 grams of iron sulfides (from the chalcopyrite and the pyrites and the bornite) and 96.25 grams of original impurities of the concentrate (non-metallic values). The theoretical weight of these solid residues is 746.9034 grams.

The specific gravities of the remaining substances are:

| | | |
|---|---|---|
| Copper | 8.96 | |
| Cupric Oxide | 6.32 | |
| Cuprous Oxide | 5.75 | – 6.09 |
| Silver | 10.53 | |
| Silver Sulfide | 6.85 | – 7.32 |
| Iron Sulfide | 4.75 | – 5.40 |
| Iron Disulfide (Limestones) | 5.0 | |
| Calcite | 2.72 | |
| Dolomite | 2.85 | |
| Argillaceous (clay) | | (wide variety below 2.75 sp. gr.) |
| Siliceous | | (wide variety below the average content of lime and silica) |
| Silica | 2.2 | – 2.6 |

After the treatment of the concentrate with the potassium or sodium polysulfides the union of the various chemical compounds in the concentrate have been made into much simpler compounds more susceptible to gravity separation. It will be observed that the limestones and silicas present have a specific gravity below 3.0, while the iron falls between 4.3 and 5.0. The silver and the copper and their salts are essentially sp. gr. of 6.0 and above. The problem is that the particles are so small that is suspension on a gravity table they tend to slime. A rotary shaft (1.720 RPM) was used which lifted the particles according to weight in dry form in a tube 17 inches long and 1½ inches wide, the overflow was the limes and silicas. A second separator, a tube 9 inches long and 1½ inches wide gave a separation of the iron salts from the copper silver and their salts in 45 minutes.

Dilute sulfuric acid (4.8%) solution dissolved the bulk of the copper oxides and left the silver, silver sulfide, and elemental copper.

The copper was melted down and dissolved. The silver and the silver sulfide was recovered in scumming the melt. The copper was pounded into sheets and used in the solution of the above oxides of copper in sulfuric acid and made the anode. The anodes were encased in a porous bag and the silver was collected in the anode slimes while the copper plated out on the starting plate used as the cathode. A little (1%) hydrochloric acid is added to the solution to precipitate any silver passing into solution as the chloride. The ideal copper sulfate solution is from 6 – 13% free sulfuric acid and a 16% copper sulfate solution. The anodes and cathodes should be about 2 inches apart, with 22 anodes and 23 cathodes employed in each cell. An E.M.F. of 100 volts will force the current through 300 of these cells. Six square foot per side of each plate (3 ft. × 2 ft. × 1½ in.) per plate were used as the theoretical point from which the reduction to the desired size was calculated.

The copper was pounded out to 1 sq. ft. and cut into 5 equal pieces. The copper sulfate solution from the copper oxides and the dilute sulfuric acid was adjusted to give a 16% copper sulfate solution and 9% free sulfuric acid. A very thin sheet (unknown thickness) was cut to match the anode copper pieces hung in the bath three-fourths inch from each other. Copper was deposited at 0.27 volts. A small quantity of lead was recovered from the anode slime bags and separated from the silver chloride by means of ammomium hydroxide which dissolves the silver and leaves the insoluble lead sulfate.

Very small amounts of arsenic and antimony were detected and 0.01% iron.

The recoveries of copper were 95% at 99.895% purity.

The silver recovery was 87.0% (from the lead, from the anode slimes, from the ppt. as chloride).

The lead recovery was 92%. (This was not analyzed as it was oxidized to recover the silver.)

The molybdenum recovery was 83% (along with the arsenic and antimony which were water soluble after the potassium tetrasulfide treatment and these were ppt. with zinc).

This test was run several times with 1000 gram samples of the concentrate and twice with 1000 lb. samples of the concentrate. The recoveries are the average of seven tests (which were all within 2% recovery of each other).

The electroplating apparatus had a potentiometer and a voltmeter was connected so that the point where copper deposited could be observed.

The apparatus of FIG. 1 was used for the 100 gram samples and the apparatus of FIG. 2 was used for the 1000 lb. samples.

The following ores can be successfully treated by the present process:

| | | | | |
|---|---|---|---|---|
| Bornite | $Cu_5FeS_4$ | Sp. Gr. | 5.07 | |
| Chalcocite | $Cu_2S$ | | 5.5 | – 5.8 |
| Chalcopyrite | $CuFeS_2$ | | 4.1 | – 4.3 |

-continued

| | | | |
|---|---|---|---|
| Covellite | CuS | 4.59 | – 6.15 |
| Enargite | $Cu_3AsS_4$ | 4.45 | |
| Stromeyerite | AgCuS | 6.15 | – 6.3 |
| Tennanite | $(Cu,Fe)_{12}As_4S_{13}$ | 4.6 | |
| Tetrahedrite | $(Cu,Fe)_{12}Sb_4S_{13}$ | 4.6 | – 5.1 |

The above are the main true sulfide forms of copper. Other suitable ores include:

| | | | | |
|---|---|---|---|---|
| Azurite | $2CuCO_3.Cu(OH)_2$ | 3.77 | – 3.83 | (An altered form of Chalcopyrite |
| Atacamite | $Cu_2Cl(OH)_3$ | 3.94 | | (An oxidized portion of ore) |
| Brochantite | $Cu_4SO_4(OH)_6$ | 3.8 | | (Oxidized zone) |
| Cuprite | $Cu_2O$ | 4.45 | | |
| Malachite | $CuCO_3.Cu(OH)_2$ | 3.9 | – 4.03 | (With other Cu. ores but altered) |
| Tenorite | CuO | 5.82 | – 6.25 | |

Other ores which can be treated by the present process include:

| | | |
|---|---|---|
| Sphalerite | ZnS | 3.9 – 4.1 |
| Wurtzite | ZnS | |
| Galena | PbS | 7.4 – 7.6 |
| Argentite | $Ag_2S$ | 7.2 – 7.36 |
| Stephanite | $5Ag_2S.Sb_2S_3$ | 6.2 – 6.23 |
| Proustite | $3Ag_2S.As_2S_3$ | 5.57 – 5.64 |
| Pyrargyrite | $3Ag_2S.Sb_2S_3$ | 5.77 – 5.86 |
| Polybasite | $Ag_{16}Sb_2S_{11}$ | 6.0 – 6.2 |
| Cerargyrite | AgCl | 5.55 |
| Molybdenite | $MoS_2$ | 4.6 – 4.8 |
| Wulfenite | $PbMoO_4$ | 6.7 – 7.0 |

(Can be with Calcium, Chromium, or Vanadium)

Some Cadmium would probably be present if the copper sulfide ore contains sphalerite (ZnS) as Greenockite CdS 4.9 – 5.0

| | | |
|---|---|---|
| Antimony Ores | | |
| Stibnite | $Sb_2S_3$ | 4.52 – 4.62 |
| Valentinite | $Sb_2O_3$ | 5.57 – 5.76 |
| (An alteration of stibnite) | | |
| Livingstonite | $HgSb_4S_7(HgS.2Sb_2S_3)$ | 4.1 – 4.8 |
| Jamesonite | $Pb_4FeSb_6S_{14}$ | 5.5 – 6.0 |
| Arsenic Ores | | |
| Enargite | $Cu_3AsS_4$ | 4.45 |
| Realgar | $As_2S_2$ | 3.4 – 3.6 |
| (From silver and lead ores) | | |
| Loellingite | $FeAs_2$ | 7.4 |
| Arsenopyrite | $FeS_2.FeAs_2$ | 5.89 |
| (With silver, lead, cobalt zinc) | | |
| Native Arsenic | | 5.72 |
| Orpiment | $As_2S_3$ | 3.5 |
| Niccolite | NiAs | 7.3 – 7.67 |
| (As replaced by Sb Ni by Fe or Co) | | |
| Scorodite | $Fe_2O_3.As_2S_3$ | |
| Bismuth Ores | | |
| Bismutite | $(BiO)_2CO_3$ | 6.1 – 7.7 (Unlikely occurrence) |
| Bismuthinite | $Bi_2S_3$ | 6.4 – 6.5 |
| Cosalite | $2PbS.Bi_2S_3$ | |
| Tetradymite | $Bi_2Te_3$ | 7.3 |

Having thus fully described the invention, what is claimed is:

1. A process for recovering copper from a sulfidic ore thereof, comprising: mixing and fusing said ore under vacuum in the absence of water, $CO_2$, and oxygen with at least a stoichiometric amount of a non-saturated sulfide of sodium or potassium at a temperature between about 210°C and 360°C thereby forming a melt of copper metal, copper oxides, and a more saturated sulfide of said sodium or potassium and separating said copper from said melt.

2. The process of claim 1 wherein said ore contains also sulfides of silver, lead, molybdenum, antimony, and arsenic.

3. The process of claim 2 comprising cooling said melt and leaching said melt with water to remove said saturated sulfide and compounds soluble therein from said copper and copper oxide in the resulting leach solution.

4. The process of claim 3 wherein said solution contains molybdenum disulfide, arsenic, and antimony and including the further steps of adding a metal above molybdenum in the EMF series to said solution to precipitate metallic molybdenum, arsenic, and antimony, filtering said solution and evaporating the filtrate to recover said saturated sulfide and any sulfur present.

5. The process of claim 1 wherein said ore is first roasted to around 300°C to remove water and carbon dioxide.

6. The process of claim 1 wherein said melt is leached with water to remove said sulfides and leave behind a washed residue and said residue is separated by gravity.

7. The process of claim 6 wherein the leach solution contains potassium pentasulfide, and said solution is evaporated to dryness and the residue is heated to form potassium tetrasulfide for recycling with more ore to form additional copper metal.

8. The process of claim 1 wherein said non-saturated sulfide of sodium or potassium is prepared in situ by mixing at least a stoichiometric amount of sodium or potassium hydroxide with sulfur and said ore at a temperature of between about 280°C and 360°C.

9. The process of claim 1 wherein products in said melt are leached with water and separated by gravity.

10. The process of claim 1 wherein said more saturated sulfide is thermally decomposed to produce the corresponding non-saturated sulfide and said non-saturated sulfide is reacted with additional ore under the conditions above stated to produce additional amounts of saturated sulfide and copper.

11. The process of claim 1 comprising adding said ore portion wise to said non-saturated sulfide and cooling said melt to below the decomposition point of the corresponding saturated sulfide before adding the last portion of ore.

* * * * *